Figure 1:
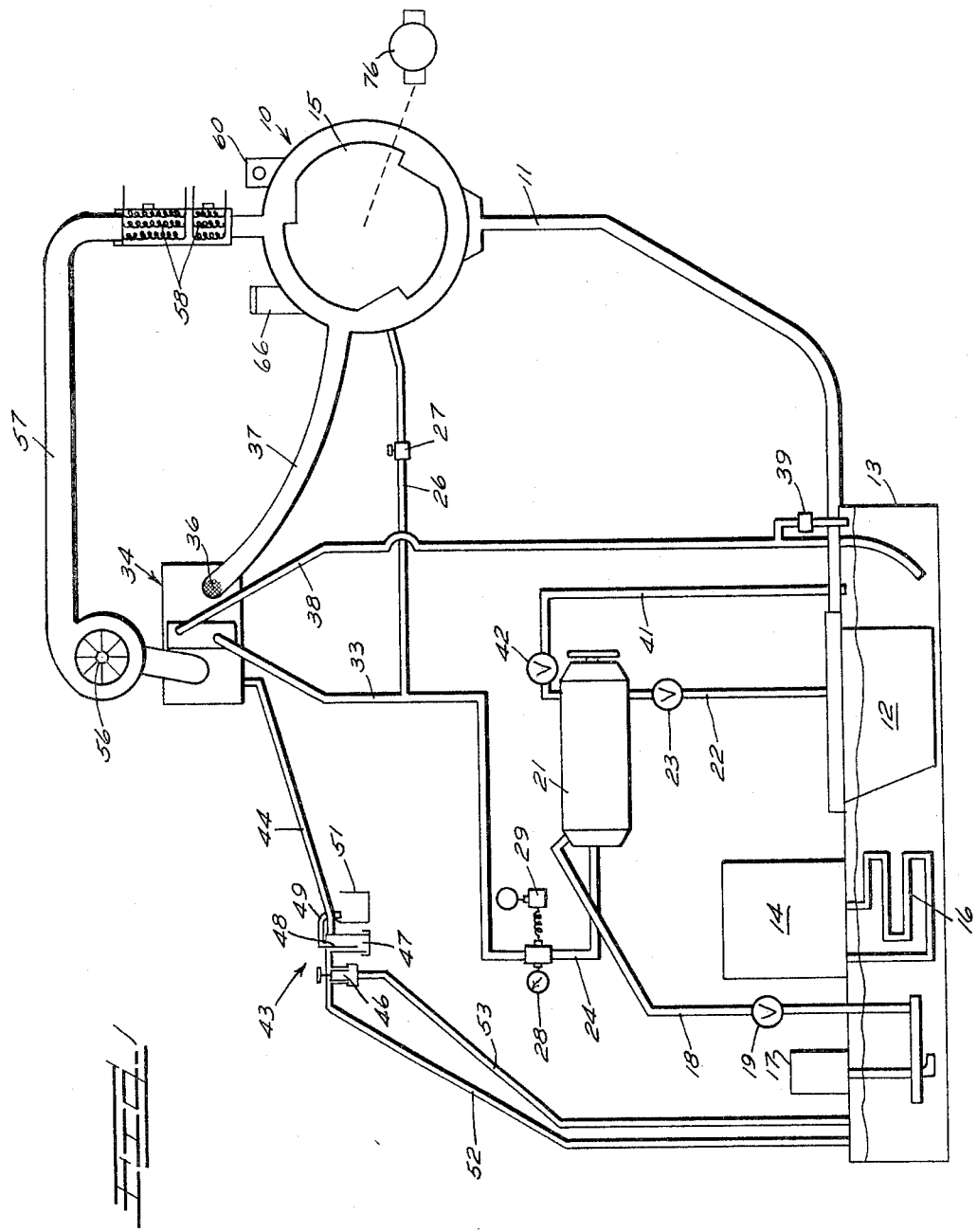

Nov. 1, 1966      N. W. NEUMANN      3,282,072
CLEANING APPARATUS HAVING A FILTER BLOCKAGE CONTROL
Filed Aug. 27, 1964      2 Sheets-Sheet 1

INVENTOR.
Neil W. Neumann

ATTORNEYS

Nov. 1, 1966  N. W. NEUMANN  3,282,072
CLEANING APPARATUS HAVING A FILTER BLOCKAGE CONTROL
Filed Aug. 27, 1964  2 Sheets-Sheet 2

INVENTOR.
Neil W. Neumann
BY
ATTORNEYS

United States Patent Office 3,282,072
Patented Nov. 1, 1966

3,282,072
CLEANING APPARATUS HAVING A FILTER
BLOCKAGE CONTROL
Neil W. Neumann, Stevensville, Mich., assignor to Whirlpool Corporation, Benton Harbor, Mich., a corporation of Delaware
Filed Aug. 27, 1964, Ser. No. 392,381
12 Claims. (Cl. 68—12)

The present invention deals with a cleaning apparatus and, more specifically, relates to hydraulic and electric circuitry for dry cleaner apparatus, particularly of the coin-operated type wherein the machine is deactivated after sensing a blocked filter a plurality of times thereby preventing premature disposal of filter cartridges.

The present invention is particularly directed to the problem occurring in automatic dry cleaning systems employing cartridge-type filter elements which may be replaced, as required, with new filter media. Such filters are presently in use, but they are normally combined with sensing devices which completely deenergize the machine upon sensing a blocked filter condition. Such deenergization, however, is not always desirable inasmuch as the temporary clogging of the filter may result from a temporary condition, and not from such an accumulation of foreign matter that replacement is indicated. In such cases, it would be more desirable to backflush or otherwise treat the filter to remove the temporary obstructions, and then place the filter back on stream. The system of the present invention is designed to operate in this manner, by providing a control system which makes allowances for temporary reduction of flow rate through the filter, but does not deenergize the entire machine until repeated sensings of the flow rate through the filter indicate that complete deenergization should be accomplished.

The system of the present invention includes an automatic control system which operates the machine through a programmed series of washing and drying cycles by means of a main timing system. The machine of the present invention also includes an auxiliary timer which is periodically indexed when a clogged or blocked condition in the filter is sensed, and ultimately renders the entire machine inoperative, and signals the operator that the filter is clogged to the point of replacement.

It is an object of the invention to provide a filter blockage control system for a dry cleaner wherein a condition is sensed within the fluid circuitry of the machine at which fluid solvent is being delivered to the washing basket at a predetermined low flow rate.

One of the objects of the present invention is to provide an improved washing apparatus employing a filter in the washing fluid circulating system, with a control circuit which permits the system to keep operating when the filter is only temporarily blocked by foreign matter.

Another object of the invention is to provide an improved control system for sensing the fluid flow rate of washing fluid in a cleaning apparatus, employing means for backflushing the filter to render it operable after temporary stoppage.

Still another object of the invention is to provide control circuitry for an automattic dry cleaner of the coin-operated type embodying a filter blockage sensing system capable of deenergizing the machine whenever the filtering ability of the filter has been seriously impaired.

Other objects, features and advantages of the present invention will become more apparent to those skilled in the art by reference to the detailed description which follows and the accompanying sheets of drawings which illustrate a preferred structural embodiment of the invention.

Figure 2:
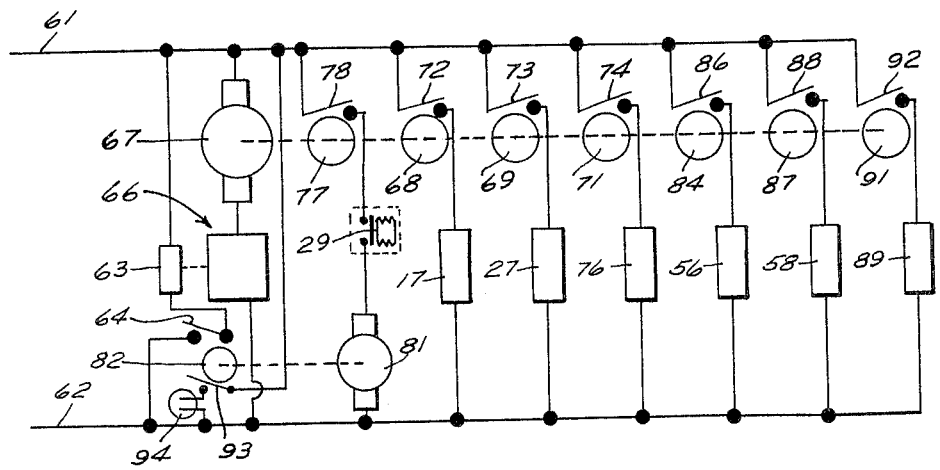
Figure 3:
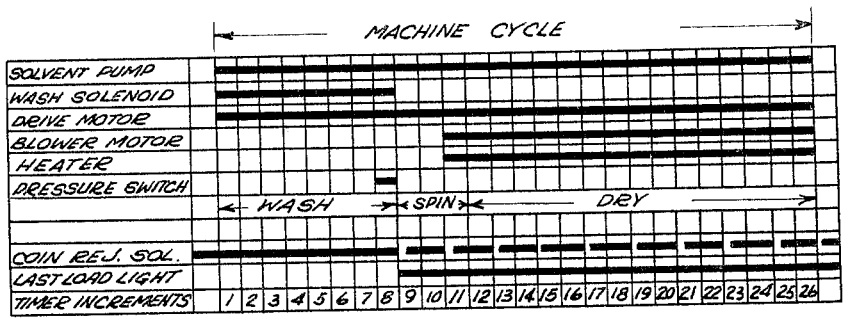

On the drawings:
FIGURE 1 is a somewhat schematic view of an automatic dry cleaning installation of the type to which the improvements of the present invention can be applied;
FIGURE 2 is a circuit diagram of the control circuit for the assembly of FIGURE 1; and
FIGURE 3 is a chart illustrating the programmed sequence which is provided by the control circuit of FIGURE 2.

As shown on the drawings:
In FIGURE 1, reference numeral 10 indicates generally a container for the fabrics to be washed, and normally consisting of a washer-tumbler combination including a perforated tub or basket 15 in which the fabrics being cleaned are agitated. The container 10 is provided with a drain conduit 11 which discharges the liquid washing fluid into a button trap 12 and ultimately into a solvent tank 13. A refrigeration unit 14 has refrigeration coils 16 immersed in the tank 13 for the purpose of cooling the solvent which, in most instances, will be a non-flammable chlorinated hydrocarbon. A pump 17 delivers solvent from the tank 13 through a conduit 18, the flow of fluid through the conduit 18 being governed by a manually operated valve 19. The conduit 18 directs the pumped fluid to the inlet of a cartridge-type filter 21. A drain conduit 22 controlled by a drain valve 23 is provided to drain the solvent back into the tank 13 during shutdown.

Cleansed fluid passing through the filter 21 is withdrawn by means of a conduit 24 and then may be introduced by means of a conduit 26 into the interior of the container 10 for contact with the fabrics being cleaned therein. A solenoid valve 27 controls the input of the solvent to the container 10.

A pressure gauge 28 and a pressure switch 29 are positioned on conduit 24 downstream of filter 21. The pressure gauge 28 permits an attendant to observe the filter outlet pressure at any time and the pressure switch 29 is effective as hereinafter described to actuate an auxiliary timer 81. The pressure switch 29 is actuated at a predetermined low pressure which is indicative of the fluid flow rate through conduit 24 and thus to container 10. Because flow rate to container 10 is directly proportional to pressure in conduit 24, the pressure switch is set to be actuated at a predetermined low pressure which indicates minimum effective solvent flow to container 10. The positioning of pressure switch 29 in conduit 24 is preferred over, for example, a position in conduit 18 where flow rate is inversely proportional to pressure, because it affords a convenient means of resetting the pressure switch if it has been actuated during a machine cycle and because of its proximity to container 10. Resetting of pressure switch 29 is accomplished when the pressure in conduit 24 exceeds the pressure at which the switch 29 is set to be actuated. The increase in pressure necessary to reset pressure switch 29 occurs automatically in conduit 24 during each machine cycle. At the start of each machine cycle, pump 17 delivers cleaning solvent to container 10 and to a condenser unit 34 through a conduit 33. The cleansing solvent flow continues to these units throughout the wash portion of the cycle. At the end of the wash portion of the cycle, the solenoid valve 27 is closed precluding solvent flow to container 10. Flow continues to condenser 34, but due to the closing of conduit 26, pressure increases in conduit 24 to thereby reset pressure switch 29.

As suggested previously, the pressure switch could be positioned in conduit 18 or elsewhere in the hydraulic circuitry of the machine at points where flow rate to or from the container 10 is proportional to pressure. In the alternative, other flow rate measuring devices could be substituted for the pressure switch in order to indicate the rate at which cleaning solvent enters or leaves container 10.

The conduit 33 is provided to direct the washing fluid to the coils, not shown, of a condenser unit 34. The condenser includes a lint filter 36 which is in communication with the container 10 by virtue of a conduit 37. The discharge from the condenser coils is directed to a conduit 38 which directs the solvent back into the reservoir 13. A branch line including an air check valve 39 is provided to bleed air into the circulating fluid line periodically thereby accomplishing backflushing of the filter element in the filter 21. The filter 21 is provided with an air bleed line 41 controlled by a floating ball check valve 42 to purge air from the filter 21 initially and to allow air to enter filter 21 during backflush.

A dry sensing mechanism and water removal system generally indicated at 43 receives liquid condensate from the condenser 34 through a conduit 44. This assembly includes a float mechanism 46 and a separating chamber 47 in which there is disposed a baffle 48. Since the water is lighter than the condensed solvent, the condensate entering into the chamber 47 will stratify and the supernatant water can be withdrawn by means of an overflow conduit 49 into a receptacle 51. The purified solvent then passes through the float mechanism 46 to return by means of a conduit 52 to the fluid reservoir 13. The float mechanism 46 is also provided with a metering orifice whose discharge is also returned to the reservoir 13 by means of a conduit 53.

Heated air is introduced into the container 10 during the drying cycle by the provision of a blower 56 which directs the air through a duct 57 past electrically energized heating elements 58 and thence into the interior of the container 10.

The operation of the assembly shown in FIGURE 1 is programmed by means of a sequential controller 60 having the control circuit shown in FIGURE 2, with a typical program cycle being illustrated in the diagram of FIGURE 3. The control circuit of FIGURE 2 is energized by means of energizing leads 61 and 62, and includes a coin reject solenoid 63 which is energized through a switch 64. Prior to insertion of coins into a coin mechanism 66, the coin reject solenoid switch 64 is closed to condition the coin mechanism for receiving coins, as illustrated in the timing diagram of FIGURE 3. When the proper number of coins has been inserted into coin mechanism 66, the main timer motor 67 is energized, commencing the washing cycle. The coin mechanism 66 consists of a coin receiving and counting mechanism which will accept a predetermined number of coins, and reject excess coins. This mechanism is described and claimed in a copending application of Samuel E. Stone and Guy D. Phillips, Serial No. 97,952, filed March 23 1961, now Patent No. 3,168,178 and assigned to the same assignee as the present application.

Energization of the main timer motor 67 at the beginning of the first of the timer increments operates cams 68, 69 and 71 to close switches 72, 73 and 74 respectively. The closing of these switches places the energizing voltage across the solvent pump 17, the wash solenoid 27, and a drive motor 76 which rotates the foraminous basket 15 contained within the container 10. During this interval, switch 64 remains closed. During the last increment of the wash cycle, or increment No. 8, shown in FIGURE 3, a cam 77 controlled by the main timer motor 67 operates to close a switch 78 for the purpose of sensing a blocked filter condition. When the fluid solvent flow rate from the filter 21 decreases, due to partial clogging of the filter, this condition is sensed by the pressure switch 29 which closes, completing the circuit to an auxiliary timer 81, which is a step-by-step timer. When the switch 29 is closed during the sensing interval, the auxiliary timer motor 81 serves to advance its associated cam 82 through one increment. A single closing of the pressure switch 29, however, is not sufficient to disable the machine, as it may be due to a purely temporary clogging condition. The main timer, at the completion of the sensing interval, thereupon resumes the normal cycle by starting the spin operation through intervals 9 through 11 as indicated in FIGURE 3. Then, the drying operation is commenced at the beginning of interval 12 and extends through the end of interval 26. During this portion of the cycle, a cam 84 controlled by the main timer motor 67 causes a switch 86 to close and thereby apply energizing voltage across the blower 56. Simultaneously, a cam 87 operates to close a switch 88 and thereby energizes the electric heating elements 58. The blower 56 and the heaters 58 are energized during the last increment of the spin cycle in order to preheat the equipment for the drying portion of the cycle.

The remaining parts of the electrical circuit embodied in the apparatus are grouped together illustratively under reference numeral 89, controlled by operation of a cam 91 which closes a switch 92 and thereby applies energizing voltage across those remaining portions of the circuit at predetermined times.

At the end of the 8th increment, the wash solenoid 27 is deenergized to prevent entry of solvent to the washing drum in the container 10. The solvent pump 17 remains energized to provide the condenser 34 with cooling solvent. Closing of the solvent line to the washing tub increases the pressure to the pressure switch 29 to reset the switch for its next sensing period during the succeeding cycle.

At the completion of each machine cycle, air is bled into the fluid circulating means to break any vacuums which may exist. Air may enter the system through the check valves 39 and 42. When this occurs, fluid solvent flows by gravity from the condenser 34 to the filter 21, thereby backflushing the filter and rearranging dirt particles remaining on or near the surface of the filter elements.

In succeeding cycles of operation, if the filter is still sufficiently clogged so that pressure switch 29 is again closed during the sensing increment, the auxiliary timer motor 81 again indexes its cam 82 through another increment. When this indexing has occurred through a sufficiently large number of cycles, for example five, as determined by the design of the cam 82, the cam 82 operates to close a switch 93 thereby energizing a lamp 94 to alert the operator to the fact that the filter has been consistently clogged for a number of cycles, and that cleaning or replacement of the filter is in order. When this occurs, the cam 82 simultaneously opens the coin reject solenoid switch 64, so that further coins are rejected by the machine.

This is the condition of the machine illustrated in FIGURE 3. That is, FIGURE 3 illustrates the sequence of switch operation during the last machine cycle prior to machine deactivation due to deenergization of coin reject solenoid 63.

During all machine cycles prior to that illustrated in heavy lines in FIGURE 3, the coin reject solenoid is energized as shown by the dashed line in FIGURE 3, and the last load light is deenergized.

In summary, a dry cleaning machine embodying the instant invention is automatically controlled through a programmed series of cleaning cycles. During one increment of each cycle means for sensing cleaning fluid flow rate through a filter are energized. When a predetermined low flow rate is sensed by the sensing means, said sensing means is effective to energize means for counting the number of cycles during which a blocked filter is sensed. After a predetermined, plural number of such sensings, the counting means is effective to deactivate the dry cleaning machine and to signal an attendant that the machine is so deactivated.

From the foregoing, it will be understood that the assembly of the present invention provides a sensing device which deactivates the machine only after a plurality of sensing intervals has determined that the filter element is in a clogged condition. The assembly thereby avoids unnecessary shutdown and inconvenience to the operator, as well as the attendant loss of profits.

It should be evident that various modifications can be made to the described embodiments without departing from the scope of the present invention.

The embodiments of the invention in which an exclusive property or privilege is claimed are defined as follows:

1. In a cleaning apparatus
   (a) a container for receiving fabrics to be washed,
   (b) a reservoir for storing washing fluid,
   (c) a filter for cleaning the washing fluid,
   (d) conduit means interconnecting said filter, said reservoir and said container for periodically circulating washing fluid therebetween,
   (e) pump means arranged to circulate washing fluid between said reservoir and said container,
   (f) sensing means actuated by the flow rate existing between said filter and said container,
   (g) switch means actuated by said sensing means and controlling operation of said pump means, and
   (h) counting means associated with said switch means to prevent deenergization of said pump means until after a predetermined plurality of operations of said switch means.

2. In a cleaning apparatus
   (a) a container for receiving fabrics to be washed,
   (b) a reservoir for storing washing fluid,
   (c) a filter for cleaning the washing fluid,
   (d) conduit means connecting said filter, said reservoir, and said container into a closed circulating system,
   (e) means for bleeding air into said closed circulating system upon the completion of an apparatus cycle,
   (f) programming means for carrying out a sequence of washing, spinning, and drying operations during an apparatus cycle,
   (g) sensing means responsive to the flow rate existing between said filter and said container,
   (h) switch means actuated by said sensing means and arranged to terminate operation of said apparatus, and
   (i) counting means associated with said switch means to prevent such termination until after a predetermined plurality of operations of said switch means.

3. In a cleaning apparatus
   (a) a container for receiving fabrics to be washed,
   (b) a reservoir for storing washing fluid,
   (c) first conduit means connecting said reservoir to said container to drain liquid washing fluid therefrom,
   (d) a filter for washing fluid,
   (e) second conduit means connecting said reservoir to the inlet of said filter,
   (f) a condenser for volatilized washing fluid,
   (g) third conduit means connecting said container to said condenser,
   (h) fourth conduit means connecting said condenser to the outlet of said filter,
   (i) a sensing means in said fourth conduit means and responsive to the flow rate therein,
   (j) a programming means arranged to conduct said apparatus through a progressive series of washing, spinning, and drying operations,
   (k) a counter actuated by said sensing means,
   (l) a cut off means in said programming means actuated by said counter, said counter being arranged to accommodate a plurality of operations by said sensing means before operating said cut off means, said cut off means being arranged to thereafter deactuate said cleaning apparatus.

4. The apparatus of claim 3 in which said sensing means is a pressure sensitive device.

5. The apparatus of claim 3 which also includes means for bleeding air into said condenser and said filter to cause washing fluid to drain by gravity from said condenser to said filter, thereby backflushing said filter.

6. The apparatus of claim 3 which includes means for automatically resetting said sensing means.

7. In a cleaning apparatus
   (a) a container for washing fabrics,
   (b) a reservoir for storing washing fluid,
   (c) a filter for cleaning washing fluid,
   (d) hydraulic circuitry connecting said reservoir to said filter, said filter to said container and said container to said reservoir,
   (e) a pump in said hydraulic circuitry for circulating washing fluid therethrough,
   (f) sensing means in said hydraulic circuitry for sensing a predetermined fluid flow rate to said container,
   (g) circuit means for controlling said cleaning apparatus through a programmed cycle of operation,
   (h) a switch in said circuit means actuated by said sensing means at said predetermined flow rate, and
   (i) means in said circuit means for counting a plurality of actuations of said switch, said means being effective after a predetermined, plural number of actuations of said switch to preclude energization of said circuit means to commence subsequent cycles of operation of said apparatus.

8. The cleaning apparatus of claim 7 wherein said sensing means is a pressure sensitive device.

9. The apparatus of claim 8 which includes means for automatically resetting said sensing means.

10. In a dry cleaner machine,
    (a) means forming an hydraulic circuit including a treatment zone and a filter,
    (b) pumping means for driving a stream of solvent through said circuit and successively through said filter and then to said treatment zone, and
    (c) control means for automatically operating the machine through a series of washing and drying periods of a programmed cycle, including sensing means between said filter and said treatment zone at one point in the circuit to sense and signal a reduced flow due to filter blockage, and further including counter means responsive to a selected plurality of signals due to reduced flow to disable the machine.

11. In a dry cleaner machine as defined in claim 10, said control means comprising a pressure sensitive switch for sensing a pressure reduction in said circuit at said one point which is a function of the flow rate.

12. A coin operated dry cleaning machine comprising
    (a) a container for washing fabrics,
    (b) a reservoir for storing washing fluid,
    (c) a filter for cleaning washing fluid,
    (d) a condenser for volatilized washing fluid,
    (e) hydraulic circuitry interconnecting said container, said reservoir, said filter and said condenser,
    (f) a pump in said hydraulic circuitry for circulating washing fluid therethrough,
    (g) a control circuit for said dry cleaning machine,
    (h) a sequential controller in said control circuit for controlling said dry cleaning machine through a programmed cycle of operation including washing and drying periods,
    (i) a coin receiving mechanism for energizing said sequential controller,
    (j) means for conditioning said coin receiving mechanism to receive coins,
    (k) a resettable pressure switch in said control circuit actuated by a predetermined pressure in said hydraulic circuitry at a point intermediate said container and said filter,
    (l) a timer in said control circuit energizable by said pressure switch only during said washing period, (m) means in said hydraulic circuitry for automatically resetting said pressure switch during said drying period, (n) means in said control circuit responsive to a plurality of energizations of said timer for deactivating said coin mechanism conditioning means after a predetermined number of said energizations, and (o) means effective upon completion of each programmed cycle for bleeding air into said hydraulic circuitry to permit washing fluid to drain by gravity from said condenser to said filter, thereby backflushing said filter.

References Cited by the Applicant
UNITED STATES PATENTS

| | | | |
|---|---|---|---|
| 2,301,803 | 11/1942 | Davis | 68—18 X |
| 3,035,428 | 5/1962 | Curtis et al. | 68—18.1 |
| 3,085,415 | 4/1963 | Gosnell | 68—12 |

WILLIAM I. PRICE, *Primary Examiner.*